United States Patent [19]

Rouge et al.

[11] Patent Number: 4,681,333

[45] Date of Patent: Jul. 21, 1987

[54] WIND PROPELLED LAND VEHICLE

[75] Inventors: Anthony Rouge, Boysenstrasse 1, D-3200 Hildesheim; Joachim Schulze, Harsum-Asel, both of Fed. Rep. of Germany

[73] Assignee: Anthony Rouge, Hildesheim, Fed. Rep. of Germany

[21] Appl. No.: 665,309

[22] Filed: Oct. 26, 1984

[30] Foreign Application Priority Data

| Oct. 27, 1983 | [DE] | Fed. Rep. of Germany | ....... 3338946 |
| Oct. 27, 1983 | [DE] | Fed. Rep. of Germany | ... 8330835[U] |
| Dec. 21, 1983 | [DE] | Fed. Rep. of Germany | ....... 3346905 |
| Dec. 21, 1983 | [DE] | Fed. Rep. of Germany | ... 8337165[U] |

[51] Int. Cl.⁴ ............................................. A63C 17/04
[52] U.S. Cl. ......................... 280/87.04 A; 280/11.28; 280/810
[58] Field of Search .................. 280/87.04 A, 87.04 B, 280/703, 704, 705, 810, 11.28, 11.1 BT, 87.04 R, 11.19, 11.27; 188/181 R, 184

[56] References Cited

U.S. PATENT DOCUMENTS

| 348,249 | 8/1886 | Tucker | ................. 280/11.28 |
| 1,150,773 | 8/1915 | La Chall | ............. 280/87.04 A |
| 1,424,523 | 8/1922 | Saives | ..................... 188/184 |
| 2,136,306 | 11/1938 | McCloy | ................. 280/11.26 |
| 2,330,147 | 9/1943 | Rodriguez | ............. 280/87.04 R |
| 3,252,713 | 5/1966 | Heller | ............. 280/87.04 A |
| 3,649,038 | 3/1972 | Huckenbeck | ................. 280/11.19 |
| 3,951,422 | 4/1976 | Hornsby | ................. 280/11.28 |
| 4,114,913 | 9/1978 | Newell et al. | ........... 280/87.04 A |
| 4,120,508 | 10/1978 | Brown et al. | ................. 280/11.28 |
| 4,200,302 | 4/1980 | De Rosnay | ............. 280/87.04 A |

FOREIGN PATENT DOCUMENTS

| 434067 | 11/1922 | Fed. Rep. of Germany | ... 280/87.04 R |
| 86990 | 1/1972 | Fed. Rep. of Germany | ... 280/87.04 A |
| 2116058 | 10/1972 | Fed. Rep. of Germany | ...... 280/703 |
| 7822468 | 11/1978 | Fed. Rep. of Germany | ..... 280/7.12 |
| 2834631 | 2/1980 | Fed. Rep. of Germany | ..... 280/7.12 |
| 3346905 | 8/1984 | Fed. Rep. of Germany | . |
| 2405722 | 10/1977 | France | .............................. 280/11.18 |
| 626539 | 11/1981 | Switzerland | ................ 280/87.04 R |

OTHER PUBLICATIONS

"Speed Sail—Sommerhit 79", Eurosport & Freizeltmode, Quick Spot 8/1978, p. 83, Maschensetsmit bindermutzen.

Primary Examiner—John J. Love
Assistant Examiner—Eric D. Culbreth
Attorney, Agent, or Firm—Collard, Roe & Galgano

[57] ABSTRACT

There is provided a steering mechanism for a wind propelled land vehicle wherein steering is made possible by the footboard being connected with the front axle by means of a steering head in the manner of a hinge connection inclined at an angle to the direction of travel. This connection features two bushes spaced a distance apart from each other, between which is positioned a sleeve affixed to the footboard. A steering pivot pin, whose longitudinal axis inclines at an angle to the direction of travel, is fitted through the bushes and the sleeve. This connection of the footboard with the front axle enables steering by a transfer of the weight of a person standing on the footboard causing the latter to be tilted out of its horizontal position into an inclined position. This action generates a torque which is transmitted to the front axle, causing this to deflect, so that the direction of travel is changed.

11 Claims, 13 Drawing Figures

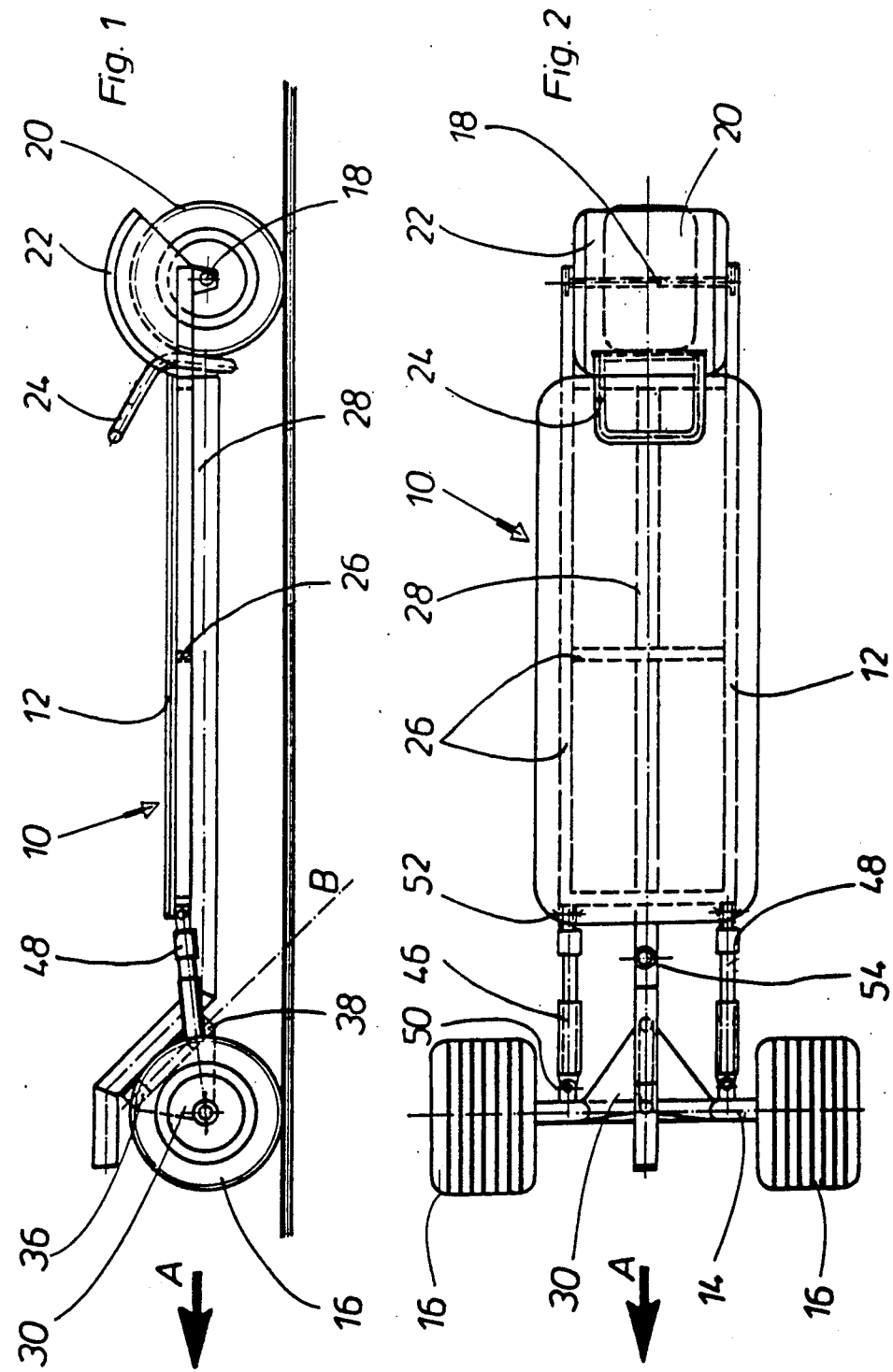

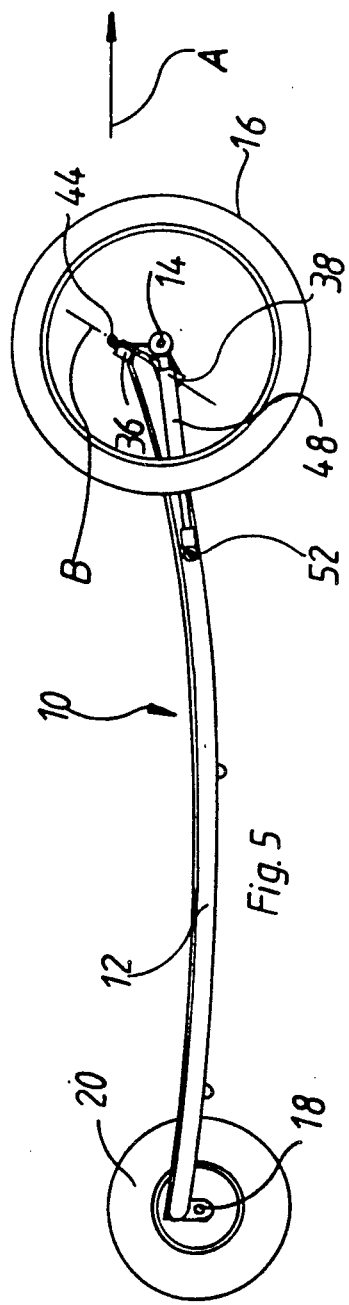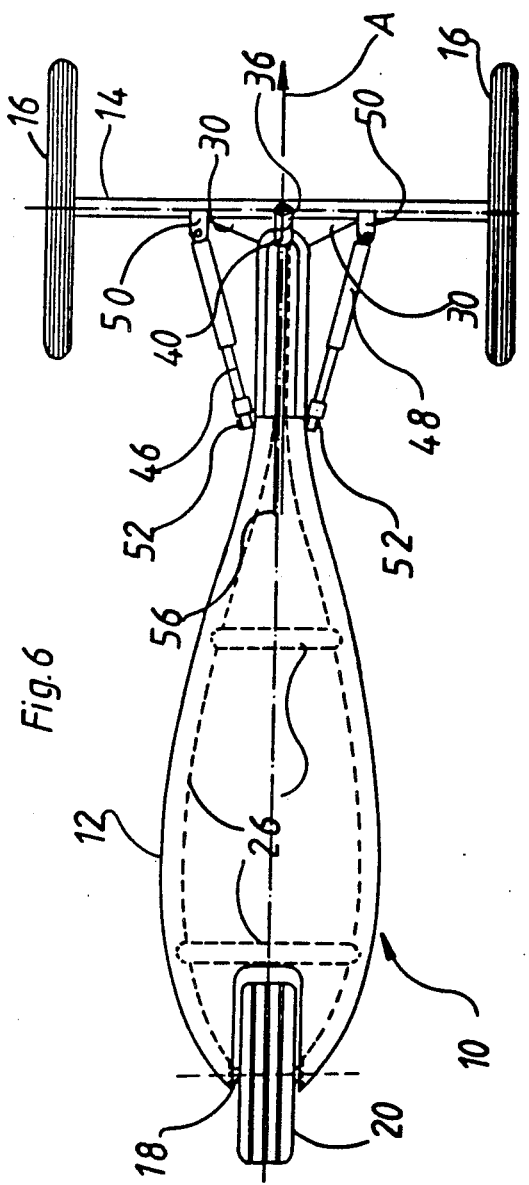
Fig. 5
Fig. 6

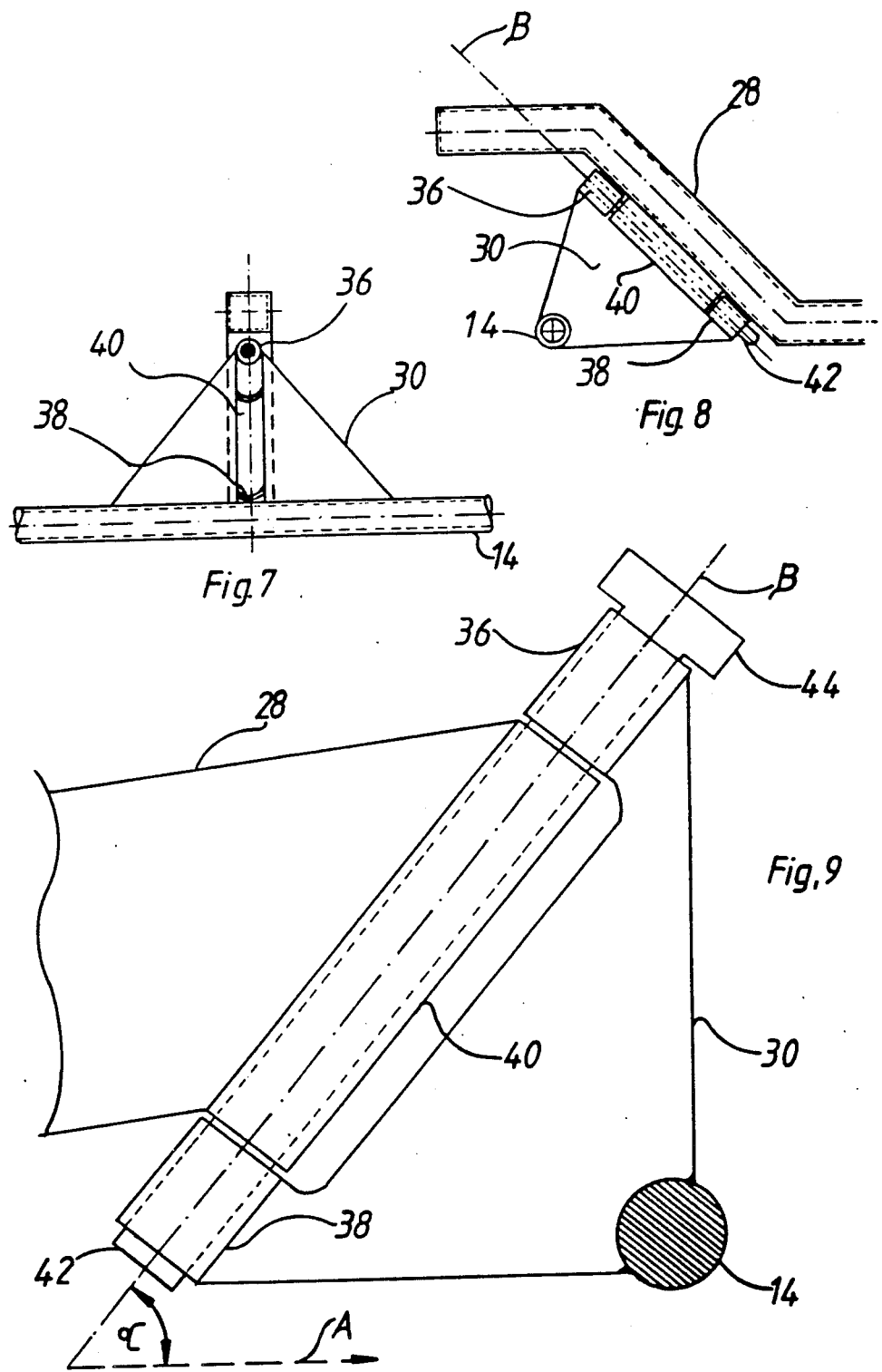

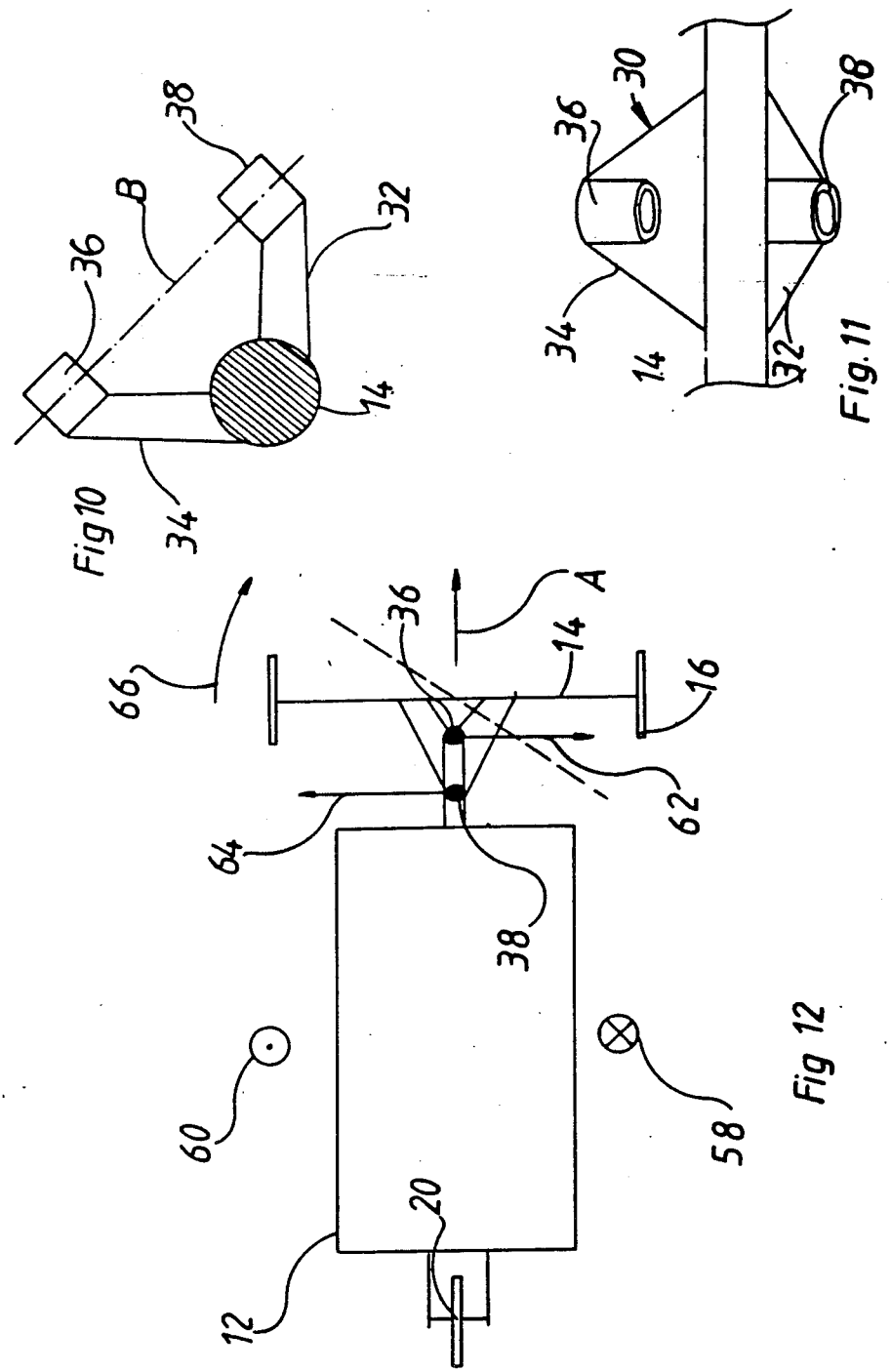

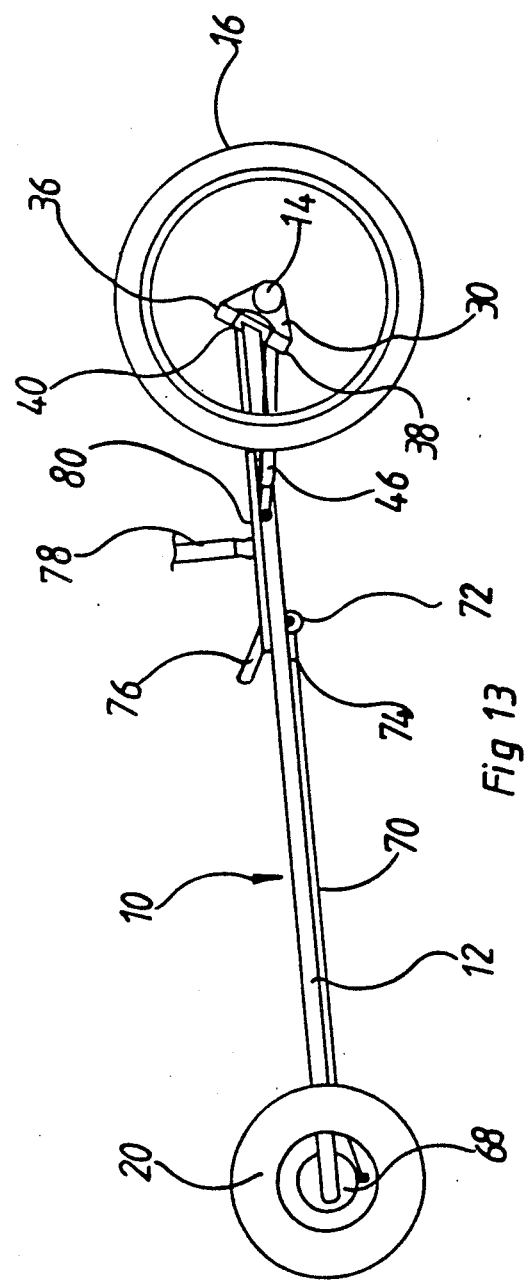

WIND PROPELLED LAND VEHICLE

The present invention relates to a vehicle having a footboard connected to motion means such as wheels or the like, at least one motion means being affixed to an axle. More particularly, the present invention relates to a wind-propelled vehicle designed as a skate board Vehicles of this type, and in particular wind propelled land vehicles, are enjoying growing popularity, as a result of which ever greater importance is being attached thereto.

Surf-boards propelled by wind power have been known for some time and are called wind surfers. For this purpose a mast bearing a sail is affixed by means of an articulated joint to the surf-board proper. The mast features a so-called boom by means of which the user standing on the surf-board is able to hold himself steady and adjust the position of the sail.

However, the scope of use of such wind surfers is confined in that they can be used on water only. With a view to exploiting the known principle of wind propulsion by means of a sail also on land, so-called beach schooners have already been devised.

The beach schooner possesses—comparable with a three-wheel vehicle—two front wheels and one rear wheel. The wheels support an elaborate frame construction featuring a part for accommodating the user who, however, does not stand but is seated. The beach schooner is therefore comparable not so much with a surf-board but more with a sail boat.

Incidentally, it is conceivable to use on a vehicle, in the manner of a surf-board, a footboard having separate axles at the front and at the rear, each axle having two wheels mounted thereon. On the footboard of such a vehicle a mast with a boom can be affixed by means of an articulated joint so that, in principle, it can be used on land in the same manner that a surf-board is used on water.

However, the solutions described are associated with considerable drawbacks in their practical application. These are due to the fact that the manner of changing the direction of travel, in other words the steering, of a water craft is, by nature, fundamentally different from the steering of a land vehicle.

Whereas in the case of a wind surfer used on water the direction of travel can be changed simply by varying the position of the sail, in the case of land vehicles fitted with wheels a separate steering mechanism is a basic necessity. For this purpose the front wheels can be steerable—as is customary on motor vehicles—or, alternatively, the entire axle with fixed, non-steerable wheels can be designed to turn relative to the direction of travel.

In the case of the aforementioned beach schooner, the necessary steering is accomplished by means of the front axle or the wheels being connected by rods or cables that are operated by the user. However, at the same time the sail also has to be maneuvered, making the handling of such a beach schooner very difficult. The user is bound literally hand and foot in maneuvering the vehicle. Furthermore, the necessary steering mechanism is elaborate and increases the cost of manufacture and maintenance of the machine.

The steering of the beach schooner described cannot be used on the aforesaid wind propelled skate board type vehicle. The person standing on the narrow footboard must hold on to the boom with his hands to steady himself and is therefore not in a position to be able to operate additional rods or cables for steering of the wheels. However, if steering of the vehicle is dispensed with, this is detrimental in that it severely confines its scope of use.

In this case, namely the vehicle can only be used to travel in a straight line owing to the fixed wheels. If a change of direction is desired, the vehicle must be stopped and turned to face the new, desired direction. In addition to this cumbersome mode of maneuvering, another factor is that it is not possible to travel in a straight line for an unlimited distance, since possible changes of wind direction frequently dictate changes in the direction of travel.

All in all, there are thus considerable drawbacks to the growing importance and popularity of the wind propelled land vehicle as a leisure sport device.

This is where the invention, which is based on the problem of providing for a vehicle, with simple means, steering that can be operated simply without the aid of the user's hands, intervenes.

The solution of this problem is accomplished in the case of a wind propelled land vehicle according to the present invention by the footboard being connected with the axle by means of a steering device in the manner of a hinge joint that is arranged at an inclined angle to the direction of travel and by the footboard being tiltable out of its horizontal position relative to the axle, thereby causing the axle to be deflected from its rest position.

The fundamental idea of the present invention consists in the articulated connection of the footboard with the front axle. Decisive thereby is that this connection, constructed in the form of a hinge, is aligned with its longitudinal axis at an angle to the direction of travel.

In a preferred embodiment, the inclined connection essential to the invention consists of a steering head affixed rigidly to the front axle and bearing two bushes spaced at a distance from each other and aligned with each other along an inclined line of alignment. Located between these two bushes is a sleeve which, in its turn, is rigidly affixed to the footboard. The actual connection is formed by a steering pivot pin fitted through the two bushes as well as through the sleeve in the middle.

The described connection, which is simple to construct, allows the front axle to be steered in surprisingly simple fashion by tilting the footboard out of its horizontal position of equilibrium into an inclined position. Such an inclined position can be achieved simply by the user standing on the footboard transferring his weight.

For instance, if the user standing on the footboard wishes to change the direction of travel of the vehicle according to the invention to the right, he need only transfer his weight to the right-hand side of the footboard in order to tilt the latter out of its horizontal position into an inclined position. This inclined position of the footboard is transmitted to the front axle in a manner that causes the latter to deflect from its straight ahead travel position, with the result that the direction of travel changes to a curvature to the right.

The invention therefore permits, with surprisingly simple means, such a vehicle to be steered by a transfer of the weight of the user standing on the footboard. It is to be considered an advantage thereby that the manner in which the steering is brought about accords with the user's natural inclination. It is known, for instance, that a person tends to lean his weight to the right in a right-hand curve, as may be observed for example when riding a motorcycle. Such a transfer of weight on the footboard, resulting in the inclined position of the footboard, leads automatically in the case of the invention to a change in the direction of travel. This makes possible steering of the vehicle which fully accords with the user's natural inclination, so that steering can be accomplished without difficulty.

Since, in the case of the novel vehicle, the desired change in the direction of travel—in other words steering—is brought about simply by the user transferring his weight on the footboard, the user is not hindered in his true and proper task of maneuvering the sail necessary for propulsion by wind power. This can be done—as in the case of known surf-boards—without hindrance by hand by means of the boom.

It has been indicated above that the arrangement of the hinge connection between the footboard and the front axle at an inclined angle to the direction of travel constitutes a decisive feature of the novel vehicle. The invention is based namely on the knowledge that only such an inclined hinge-like connection makes it possible for positions of the footboard deviating from the horizontal to be converted into a change of direction by a deflection of the front axle. Only if the two bushes rigidly connected to the front axle are arranged in alignment along a line running at an inclined angle to the direction of travel, is it possible to cause a deflection, respectively steering, of the front axle. By transfer of the user's weight on the footboard a torque is transmitted to the front axle by virtue of the steering pivot pin fitted through the two bushes and the sleeve affixed to the footboard, causing the desired change of direction.

A correlation thereby exists between the degree to which the footboard is tilted out of its horizontal position and the degree of the resulting deflection of the front axle, whereby the degree of deflection brought about by the transfer of weight on the footboard depends on the slope, respectively the inclined arrangement, of the hinge-like connection.

For this purpose, according to an advantageous embodiment of the invention, the direction of the inclined line of alignment of the hinge-like connection can be designed to be variable, permitting adjustment in accordance with the proficiency and skill of the individual user. In the case of a beginner, for instance, it is advisable to set the inclined angle of the hinge-like connection in such a manner that deviations in the position of the footboard from horizontal produce only small deflections and thus a small change in the direction of travel.

According to another advantageous embodiment of the invention, provision is made for two steering dampers arranged on either side of the steering head and connected by means of articulated joints to both the front axle and the footboard. By means of such steering dampers, constructed in the manner of shock absorbers, there is a certain measure of resistance to a change in the position of the footboard from the horizontal, which serves in practice as a safety factor. The tilting of the footboard brought about by a transfer of weight thus takes place against a certain resistance, enabling unintentional changes in the direction of travel to be avoided.

Preferably, the novel vehicle is fitted with one wheel at each of the two outer ends of the front axle and a single wheel at the rear end of the footboard. This arrangement permits use on land given normal ground conditions. However, it is also possible for the novel vehicle to be used on snow or ice. A useful embodiment of the invention provides, namely, for the means of motion to be constructed in the form of skids (as customary on ice skates) or in the form of skis.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 1 is a side elevational view of a vehicle according to the present invention;

FIG. 2 is a plan view of the vehicle shown in FIG. 1;

FIG. 5 is a side elevational view of yet another embodiment of a vehicle according to the present invention;

FIG. 6 is a plan view of the vehicle shown in FIG. 5;

FIG. 7 is a bottom view looking up of the hinge-like connection;

FIG. 8 is a side elevational view of the connection shown in FIG. 7;

FIG. 9 is a side elevational view of a steering head;

FIG. 10 is a further side elevational view of a steering head;

FIG. 11 is a top plan view of the connection according to FIG. 10;

FIG. 12 is a schematic drawing illustrating the steering possible with the present invention;

FIG. 13 is a side elevational view of a further embodiment of the novel vehicle with a braking device;

FIG. 14 is a plan view similar to FIG. 4 showing another embodiment of the vehicle; and FIG. 15 is a plan view similar to FIG. 4 showing still another embodiment of the vehicle.

Figure 3:
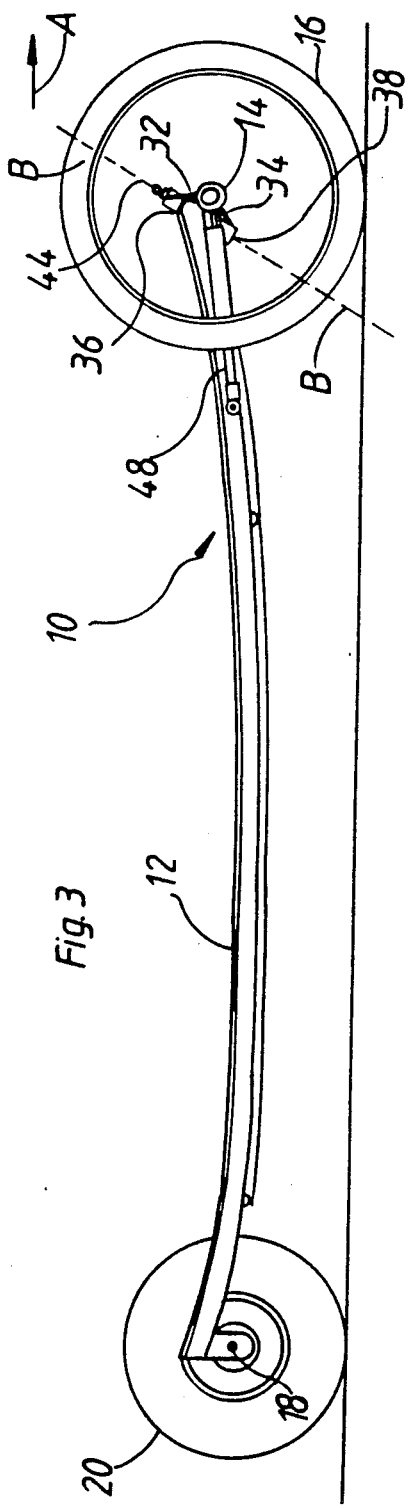
FIG. 3 is a side elevational view of another embodiment of a vehicle according to the present invention.

Now turning to the drawings, FIGS. 1-6 depict three embodiments of a vehicle 10, wherein the parts corresponding to one another in the various figures are given the same reference numeral. Each embodiment of vehicle 10 is shown in each case by a side elevational view and by a top plan view.

In addition to the steering, which will be described in greater detail below, vehicle 10 possesses, as essential parts, a footboard 12 connected both with a front axle 14 and with a rear axle 18. The latter has mounted thereon one rear wheel 20, while provision is made for two wheels 16 on front axle 14, so that the vehicle is capable of traveling on land.

For its propulsion by wind power, vehicle 10 is equipped with a rig consisting of a mast and a boom for a sail (not shown in the drawing for reasons of greater clarity). However, a mast rail 56 is shown in FIG. 6 which can be fitted with a mounting element for the articulated attachment of the mast. A fastening element 54 is also indicated in FIG. 2 for the attachment of a mast, allowing propulsion of vehicle board 10 by wind power as in the case of the known wind surfer.

Different shapes are conceivable for footboard 12 of vehicle 10. In FIGS. 1 and 2 the footboard possesses a roughly rectangular shape, while in FIGS. 4 and 6 it tapers to the front and to the rear. Furthermore, footboard 12 in FIGS. 3 and 5 is not horizontal but slightly curved.

In all cases footboard 12 is supported, respectively borne, by a support frame 26 with a central support bar 28 to provide mechanical stability.

Rear axle 18 is also affixed to support frame 26. Footboard 12 can be made, for instance, of wood, to which, as appropriate, a slip-proof rubber covering can be applied.

The vehicle according to FIGS. 1 and 2 also is provided with a guard 22 for rear wheel 20 and, in addition, this embodiment features a brake lever 24, movably mounted on support frame 26, whose lower part is pressed against rear wheel 20 when operated, causing the vehicle to be braked by friction.

The decisive constituent part of vehicle 10, whose direction of travel is indicated in the drawing in each case by an arrow A, consists of a steering mechanism which enables vehicle 10 to be steered by a deflection of front axle 14 from its normal position. In the position shown in the drawings, front axle 14 is at right angle to central support bar 28.

In addition to the illustrations in FIGS. 1–6 it is particularly clear in FIGS. 7, 8 and 9 that front axle 14 is rigidly affixed at its center to a steering head 30, formed according to FIGS. 7 and 8 by two substantially triangular parts. As seen in the side view according to FIG. 3 and in FIGS. 10 and 11 steering head 30 is formed in each case by two fixing straps 32 and 34 that are rigidly affixed to front axle 14.

At its ends facing away from front axle 14 steering head 30 features an upper bush 36 and a lower bush 38. The two bushes are arranged in alignment with each other, along a line of alignment B running at an inclined angle to the direction of travel A. The direction of travel A and the line of alignment B form an angle $\alpha$ which is less than 90° and preferably 45°, as clearly seen in FIG. 9.

Located on the front of support frame 26 connected to support bar 28, as clearly seen in FIGS. 7 to 9, is a sleeve 40 which is also arranged at an angle of incline corresponding to the incline of the line of alignment B. Sleeve 40 is positioned between the two spaced-apart bushes 36 and 38 and a steering pivot pin 42, having a head 44 at its upper end (FIG. 9), is fitted through bushes 36 and 38 as well as through sleeve 40.

Through the configuration described, a hinge-like connection is thus formed between footboard 12 and front axle 14 by means of the steering pivot pin 42, the two bushes 36 and 38 and sleeve 40. The special feature of this connection is to be seen in its inclined arrangement—relative to the direction of travel A—which permits, in astonishing fashion, front axle 14 to be steered by a transfer of the weight of a person standing on footboard 12, the transfer of weight causing footboard 12 to be tilted out of its horizontal position of equilibrium into an inclined position.

The principle of steering vehicles 10 is based on the transmission of a force by means of sleeve 40 and steering pivot pin 42 to the two spaced-apart bushes 36 and 38, the transmission of force being brought about by a tilting of footboard 12.

The schematic diagram in FIG. 12 indicates the two bushes 36 and 38 which, in top view, are shown to be spaced at a distance from each other owing to the inclined arrangement.

Let us assume that footboard 12 is tilted out of its horizontal position into an inclined position, the end of the arrow 58 on the right-hand side of footboard 12 indicating that this side is depressed downwards—in other words towards the ground, causing the opposite left-hand side of footboard 12 to be lifted away from the ground, as the tip of the arrow 60 serves to indicate.

By means of sleeve 40 and steering pivot pin 42 the tilting movement of footboard 12 is transmitted to the two bushes 36 and 38, a rightward force 62 being exerted on upper bush 36 and a leftward force 64 being exerted on lower bush 38. As the two points at which the forces are applied—namely bushes 36 and 38—are spaced at a distance apart from each other, the two forces 62 and 64 produce a torque in a known manner which is transmitted to front axle 14 by means of the steering head, causing a deflection to the right in the sense of arrow 66.

Hence, if a person standing on footboard 12 transfers his weight to the right, thereby causing footboard 12 to tilt at a corresponding angle, skate board 10 turns to the right.

Accordingly, a left-hand curve can be circumscribed by a transfer of weight to the left-hand side of footboard 12. The degree to which the direction of travel is changed depends on the given angle of incline of footboard 12. The higher the angle of incline of footboard 12, the greater the change in the direction of travel.

The aforegoing description makes it clear that the dependence of the steering on the angle of incline of footboard 12 also depends on the angle of incline of the line of alignment B. The further apart the two bushes 36 and 38 are from each other when viewed from above according to FIG. 12, the greater the torque, and thus the axle deflection, in a given case.

It has proven advantageous to provide for damping elements between front axle 14 and footboard 12 which exert a certain measure of resistance against a movement of footboard 12 out of its horizontal position of equilibrium and thus promote a safe steering operation. For expediency, steering dampers 46 and 48 are arranged on either side of steering head 30 and connected by means of articulated joints 50 to front axle 14 and by means of articulated joints 52 to support frame 26, respectively footboard 12.

Without steering dampers 46 and 48, for which normal shock absorbers can be used, any slight transfer of weight of a user on footboard 12 would immediately cause the steering to react, while by virtue of steering dampers 46 and 48 a certain resistance has first to be overcome for a desired change of direction.

In practical trials with vehicle 10 the outstanding steering characteristics were confirmed in the best possible fashion. It has also been established that, given favorable wind conditions, substantial speeds can be attained with vehicle 10. For reasons of safety a brake lever 24 has therefore already been provided for in FIGS. 1 and 2 for braking.

An improved embodiment of a braking device for vehicle 10 is shown in FIG. 13. Moreover, a mast 78 is partly shown in this diagram on a mast rail 80.

The braking device of FIG. 13 consists of a brake pedal 76 which is connected to a brake cable 70. The latter is led around a brake fulcrum 72 and held by a brake cable stay 74. When brake pedal 76 is operated, the brake cable acts on a brake drum 68 that is fitted on rear wheel 20.

The braking device described—and, here, in particular the location of brake pedal 76 near mast 78—is of particular advantage, since brake pedal 76 can be operated easily by a user standing near mast 78.

It is also possible, moreover, to provide for an automatic brake that is brought into action automatically if vehicle 10 exceeds a predetermined speed.

According to the condition of the terrain, different front wheels 16 and rear wheels 20 can be used on the vehicle. In FIGS. 1 and 2 the wheels are of relatively wide design, while in the other embodiments of vehicle 10 narrow wheels have been shown.

The vehicle according to the invention can also be used without further elaboration on snow or on ice. For such uses the wheels can be replaced by skis or by skids in the manner of ice skates. The novel steering mechanism is also effective in each case on such modifications.

Figure 4:
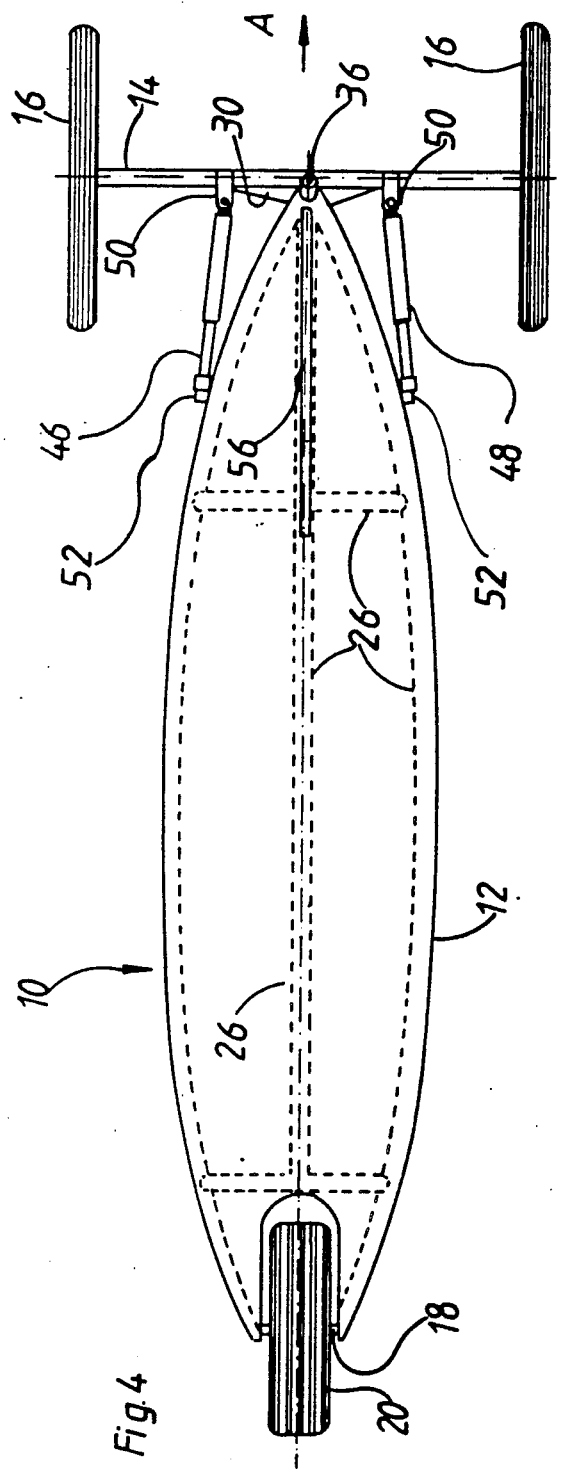
FIG. 4 is a plan view of the vehicle shown in FIG. 3.

As clearly seen in FIG. 14, vehicle 10 therein is in all essential respects identical to vehicle 10 shown in FIGS. 3 and 4 except that front wheels 16 have been replaced by snow skis 16' and rear wheel 20 has been replaced by snow ski 20'. Also as clearly seen in FIG. 15, the front wheels 16 of the vehicle of FIGS. 3 and 4 have been replaced by ice runners 16" and the rear wheel 20 replaced by ice runner 20".

While only a few embodiments of the present invention have been shown and described, it will be obvious that many changes and modifications may be made thereunto without departing from the spirit and scope of the invention.

What is claimed is:

1. A wind propelled land vehicle, comprising:
    (a) a footboard having first and second ends and upper and lower surfaces;
    (b) a front axle disposed at the first end of said footboard;
    (c) a rear axle disposed at and fixedly mounted to the second end of said footboard;
    (d) steering means for said vehicle including a steering head mounted centrally on said front axle, said steering head comprising two spaced bushes aligned along an axis inclined to the direction of movement of said vehicle, a first one of said bushes being disposed on said axis below and to the rear of a second one of said bushes, a sleeve mounted to said footboard and having an inclined axis coinciding with the axis of said bushes, and a steering pivot pin connecting said two buses axially with said sleeve, said first bush being disposed below said lower surface of said footboard and said second bush being disposed above said upper surface of said footboard;
    (e) spaced motion apart means mounted on said front axle for permitting movement of said vehicle over a surface, said spaced apart motion means being symmetrically located with respect to the longitudinal axis of said footboard;
    (f) single means mounted on said rear axle for permitting movement of said vehicle over a surface; and
    (g) steering damper means comprising spaced apart shock absorbers mounted symmetrically with respect to said steering head and connecting said front axle to said footboard in an articulated manner.

2. The vehicle according to claim 1, wherein said inclined sleeve is disposed between said two bushes of said steering head.

3. The vehicle according to claim 1, wherein the axis of said two spaced bushes is inclined at an angle less than 90° to the direction of travel of said vehicle.

4. The vehicle according to claim 1, wherein the axis of said two spaced bushes is inclined at an angle of 45° to the direction of travel of said vehicle.

5. The vehicle according to claim 1, wherein said damping element comprises a shock absorber operatively connected on either side of said steering head to said footboard.

6. The vehicle according to claim 1, wherein said footboard is connected to a rear axle at the end opposite thereof from said front axle.

7. The vehicle according to claim 1, wherein said motion means are wheels.

8. The vehicle according to claim 1, wherein said motion means are ice skate type runners.

9. The vehicle according to claim 1, wherein said motion means are skis.

10. The vehicle according to claim 1, which further comprises a braking means to brake said vehicle.

11. The vehicle according to claim 1, which further includes a rig for a sail for wind propulsion in the manner of a wind surf-board.

* * * * *